(12) United States Patent
Vidal

(10) Patent No.: US 6,283,680 B1
(45) Date of Patent: Sep. 4, 2001

(54) DEVICE FOR PNEUMATIC TRANSPORT OF MATERIAL SUCH AS CONCRETE

(76) Inventor: Lucien Vidal, Domains de la Pimpine, F-33360 Latresne (FR)

( * ) Notice: Subject to any disclaimer, the term of this patent is extended or adjusted under 35 U.S.C. 154(b) by 0 days.

(21) Appl. No.: 09/555,728

(22) PCT Filed: Dec. 2, 1998

(86) PCT No.: PCT/FR98/02592
§ 371 Date: Jul. 28, 2000
§ 102(e) Date: Jul. 28, 2000

(87) PCT Pub. No.: WO99/28221
PCT Pub. Date: Jun. 10, 1999

(30) Foreign Application Priority Data

Dec. 2, 1997 (FR) .................................................. 97 15148

(51) Int. Cl.[7] .................................................. B65G 53/46
(52) U.S. Cl. .................. 406/128; 406/50; 406/144; 406/196; 406/198; 222/207; 222/212
(58) Field of Search ................... 406/50, 144, 153, 406/128, 196, 198, 207, 212, 630, 214; 222/450

(56) References Cited

U.S. PATENT DOCUMENTS

| | | | |
|---|---|---|---|
| 2,412,397 | * 10/1946 | Harper | 103/148 |
| 2,733,814 | * 2/1956 | Booth | 210/1 |
| 3,971,494 | * 7/1976 | Rosen | 222/450 |
| 4,042,153 | * 8/1977 | Callahan et al. | 222/207 |
| 4,060,183 | * 11/1977 | Puurunen | 222/450 |
| 4,893,966 | * 1/1990 | Roehl | 406/128 |

* cited by examiner

*Primary Examiner*—Christopher P. Ellis
*Assistant Examiner*—Joe Dillon, Jr.
(74) *Attorney, Agent, or Firm*—Nath & Associates PLLC; Gary M. Nath; Harold L. Novick

(57) ABSTRACT

Apparatus for transporting a material such as concrete utilizes a flexible duct connected to a hopper and includes a device that can pinch the duct. The pinching device has first and second pinch members that are movable transversely relative to the duct, and a drive member situated between the pinch members and likewise movable transversely to the duct. The apparatus also has an air injector, and a controller for timing the injection of air and the movements of the pinch and drive members so as to drive the material in the flexible duct.

12 Claims, 3 Drawing Sheets

DEVICE FOR PNEUMATIC TRANSPORT OF MATERIAL SUCH AS CONCRETE

The present invention relates to apparatus for transporting a particulate or granular material such as concrete, which device comprises a flexible duct having an upstream end connected to material feed means, and a downstream end, means for pinching said duct in timed manner, and means for injecting compressed air into the duct and capable of being opened and closed in timed manner.

Apparatus of that type is used for example to transport concrete constituted by a mixture of cement and aggregate between a feed hopper and an assembly for spraying concrete and terminating in a spray nozzle. The apparatus is usable for the "dry" spraying technique in which the mixture of materials is transported in the hose while in the dry state and is moistened only in the vicinity of the nozzle outlet, or for the "diluted-flow wet" spray technique in which the mixture of concrete is already moistened before penetrating into the duct.

Apparatus of that type can also be used for transporting materials other than concrete, for example foodstuffs based on grains or granulates, such as wheat.

European patent No. 0 588 737 discloses apparatus of that type in which the means for pinching the duct comprise pinching projections disposed on a moving assembly, each of the projections moving in turn along the duct so as to pinch it and drive the material downstream while creating suction immediately upstream from the projection to encourage ingress of material into the duct. Compressed air is used to regulate transport of the substance and it is injected into the duct when it is no longer or practically no longer pinched by a projection. To prevent the air under pressure having any tendency to drive the material back towards the feed means, the known apparatus also includes a presser element which closes the duct upstream from the inlet for air under pressure, throughout the air injection sequence.

More precisely, in that known apparatus, when a first projection pinches the duct, which pinching takes place substantially level with the inlet for air under pressure and downstream from the presser element, the feed of air under pressure is cut off while the presser element is open, and the projection moves along the duct so as to drive the air/material mixture towards the outlet of the duct while enabling said duct to be filled upstream. Thereafter, when said first projection reaches a region of the duct in which it practically ceases to pinch it, while the second projection has not yet reached a situation in which it begins to pinch the duct, the presser element is closed and the feed for air under pressure is opened so as to drive the material towards the outlet. Thereafter, substantially when the second projection reaches the situation in which it begins to pinch the duct, the air feed is closed and then the presser element is opened so as to feed the duct with material.

Although that apparatus gives general satisfaction, it nevertheless suffers from drawbacks. Firstly, the duct deteriorates rapidly under the effect of the high friction stresses and/or rolling stresses exerted by the projections as they move along the duct while pinching it. This constitutes a major drawback insofar as the duct is relatively expensive since it must be strong while nevertheless having a high degree of radial elasticity enabling it to return to its normal radial dimensions when pinching by a projection ceases. Conventionally, when the apparatus is used to transport concrete or similar material, the duct is made using reinforced rubber. In addition to the problems of cost, the need to replace the duct often gives rise to frequent maintenance operations.

Secondly, that known apparatus does not manage completely to prevent air being driven back towards the feed means. It is mentioned above that the presser element which is closed during injection of compressed air is disposed upstream from the zone where the projections first pinch the duct as they move along it. It is not possible to place the presser element in the immediate proximity of said contact zone, since a small distance is necessary to enable the projections to approach as part of their displacement cycle. Consequently, when a projection begins to pinch the duct, it shuts off air under pressure in the portion of duct that is situated between the presser element and the pinch zone.

Thus, when the presser element is opened to allow the duct to be fed with material, a pocket of air under pressure situated in this portion of the duct expands, with the air tending to escape upstream along the duct. This air entrains "dust" of the material that is to be transported into the surrounding space. In some applications, e.g. when the material is a dry mixture of cement and aggregate, the dust is harmful and contrary to safety standards. In all cases, whatever the nature of the material transported, including materials constituted by food grains such as wheat, such dust is undesirable.

An object of the invention is to remedy the above-mentioned drawbacks by proposing apparatus that is improved for the purpose of increasing the lifetime of ducts and, above all, for eliminating or at least considerably restricting dust rejection under the effect of air under pressure escaping.

This object is achieved by the fact that the means for pinching the duct comprise a first pinch member and a second pinch member situated downstream from the first pinch member in the material transport direction, each pinch member being movable transversely to the duct between a relaxed position and a pinching position;

by the fact that the apparatus include a drive member situated between said first and second pinch members and suitable for being displaced transversely to the duct between an inactive position and an active position in which it co-operates with the duct substantially to flatten it;

by the fact that the air injection means open out into a region of the duct situated between the first and second pinch members in the vicinity of said first pinch member; and by the fact that the apparatus includes means for timing the injection of compressed air and the movements of the pinch members and of the drive member to perform successive cycles comprising the following stages;

a filling stage in which the first pinch member is in its relaxed position, the air injection means are closed, the drive member is in its inactive position, and the second pinch member is in its pinching position; and a drive stage during which the first pinch member is in its pinching position, the air injection means move from being closed to being opened, the drive member moves from its inactive position to its active position, and the second pinch member is in its relaxed position.

Thus, according to the invention, the pinching and drive members which exert large stresses on the duct move transversely relative to the duct without moving along it, thereby limiting deterioration of the duct. In addition, while air is being injected, the duct is closed in its upstream region by the first pinch member, and at least towards the end of the air injection stage, the drive member is occupying its active position (it flattens the duct). Thus, even if air is held captive in the duct beneath said drive member while the second pinch member is being put into its pinching position before a new filling stage begins, the quantity of air involved can only be very small.

As soon as the drive member has gone from its active position to its inactive position, suction is created which allows any such small quantity of air to expand and prevents it from escaping upstream. In addition, the suction serves to suck material from the hopper into the duct, thereby facilitating and accelerating filling of the duct.

When it is stated that in its active position the drive member substantially flattens the duct, that means that in this position the duct is practically in the shape of a flat element whose two facing internal faces are in contact with each other or are at least extremely close to each other. Nevertheless, there is no need for the drive member to press the two internal faces hard against each other, so stresses on the duct can be kept small.

Advantageously, the means for timing the injection of compressed air and the movements of the pinch members and of the drive member are also suitable, after the drive stage of each cycle, for providing a decompression stage in which the first and second pinch members are in their pinching positions, the air injection means are closed, and the drive member is caused to move from its active position towards its inactive position.

This additional decompression stage is particularly desirable if the portion of duct that might contain air under pressure between the two pinch members and beneath the drive member when it is in its active position is of a volume that is not completely negligible. Under such circumstances, the decompression stage considerably increases the volume of said duct portion and expands any air contained in said volume immediately before the first pinch member takes up its relaxed position.

Advantageously, the apparatus includes means for adjusting the relaxed position of the first pinch member.

These adjustment means make it possible to select the section presented by the duct in the relaxed position of the first pinch member. Even in this relation position, it can be ensured that the first pinch member continues to co-operate with the duct to constrict its section slightly relative to its section in the free state. Insofar as the section of the duct determines the rate at which it fills with material, these adjustment means thus make it possible to adapt the corresponding rate of transport to the work which is to be performed.

Advantageously, the apparatus includes means for adjusting the frequency of the timing cycles (number of cycles per unit time) to vary the rate at which the material is transported and to adapt it to the work which is to be performed.

The invention will be well understood and its advantages will appear more clearly on reading the following detailed description of an embodiment and variants thereof given as non-limiting examples. The description refers to the accompanying drawings, in which.

Figure 1:
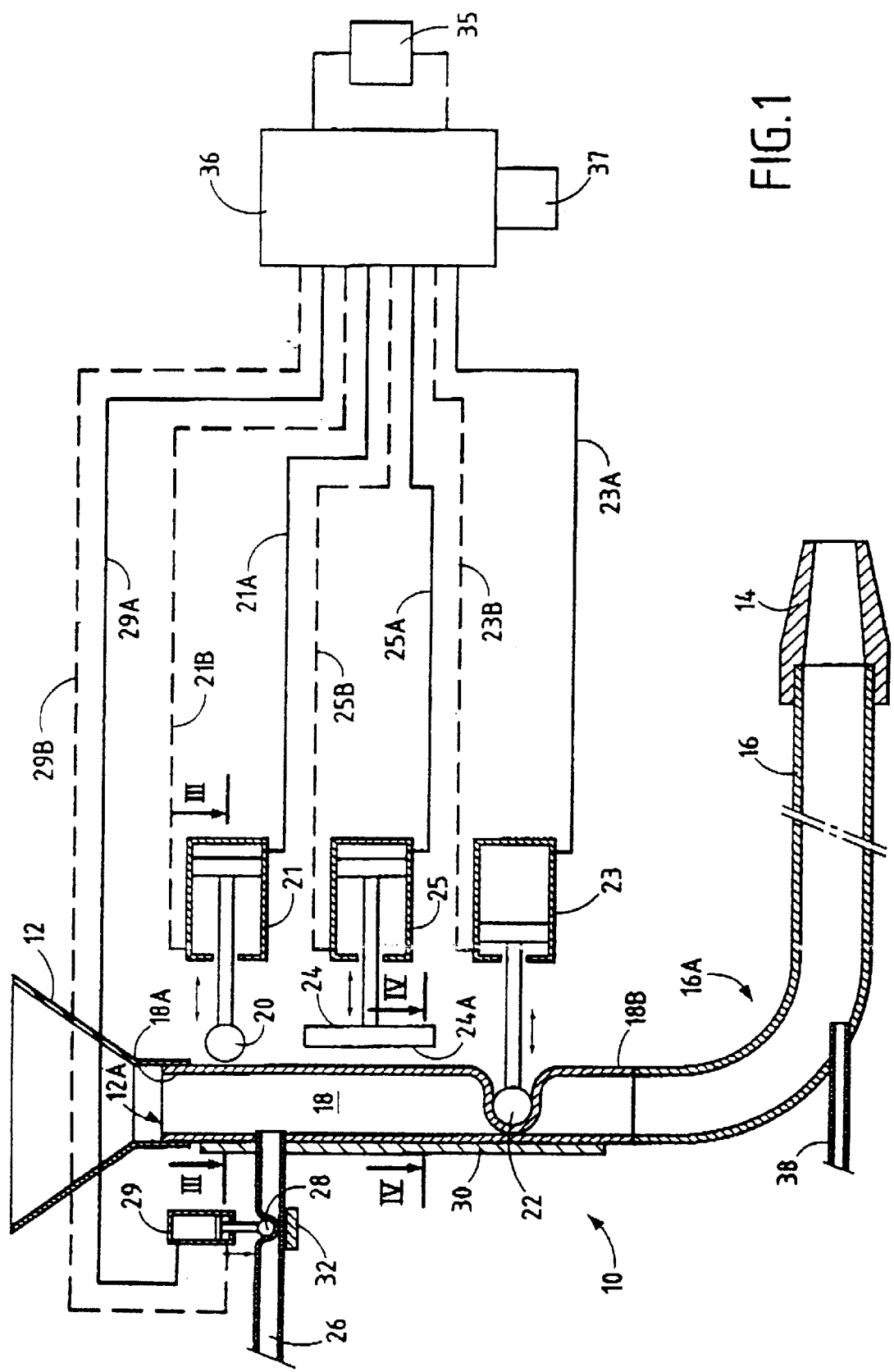
FIG. 1 is a diagrammatic section view of apparatus of the invention.

The apparatus given overall reference 10 in FIG. 1 serves to transport a material based on particles such as concrete from a hopper 12 to a spray nozzle 14 situated at the end of a transport pipe 16. The apparatus comprises a flexible duct 18 which is connected to the feed hopper 12 at its upstream end 18A and to the transport pipe 16 at its downstream end 18B. Naturally, upstream and downstream are identified relative to the direction in which material is transported from the hopper 12 to the nozzle 14.

The apparatus 10 also has a first pinch member 20 and a second pinch member 22 which is situated downstream from the first. Each of the two pinch members can be moved transversely relative to the duct 18 between a relaxed position and a pinching position. In the situation shown in FIG. 1, the first pinch member 20 is in its relaxed position, i.e. it is not pinching the duct 18 and leaves a passage for the material contained in the hopper 12, while the second pinch member 22 is shown in its pinching position in which it closes the duct in leakproof manner, thus preventing the air/material mixture passing its position in the downstream direction or indeed in the upstream direction.

The apparatus also has a drive member 24 which is situated between the first and second pinch members 20 and 22. Like the pinch members, the drive member is suitable for being displaced transversely relative to the duct. In FIG. 1, the drive member 24 is shown in its inactive position, in which it is not pressing or is pressing very little against the wall of the duct 18. Starting from this position, it can be displaced transversely towards the inside of the duct so as to flatten it.

The apparatus also includes air injector means opening out into a region of the duct 18 situated between the first and second pinch members 20 and 22, and more precisely in the vicinity of the first pinch member 20. In the example shown, the air injector means comprise a hose 26 connected to a source of air under pressure (not shown), with the end of said hose being connected to the duct 18 immediately downstream from the first pinch member 20.

The injection of compressed air can be under the control of means for opening and closing the hose 26. Any type of controlled valve can be used for this purpose. Nevertheless, in this example, the means for opening and closing injection of compressed air comprise a pinch member 28 generally similar in shape to the members 20 and 22 although possibly smaller in size, this pinch member 28 being capable of being displaced transversely relative to the hose 26 between a relaxed position in which it allows compressed air to be injected into the duct 18 and a pinching position in which it prevents compressed air being injected.

In the example shown, each pinch member 20 and 22 comprises a moving piston or the like situated on one side only of the duct 18, with the other side of the duct bearing against a rigid wall element 30. When in their pinching positions, the members 20 and 22 thus pinch the duct between themselves and the wall element 30. The drive member 24 is situated on the same side as the pinch members 20 and 22.

The pinch member 28 for controlling the injection of air via the hose 26 operates in the same manner, said hose pressing against a rigid wall element 32 on its side remote from the member 28.

Figure 6:
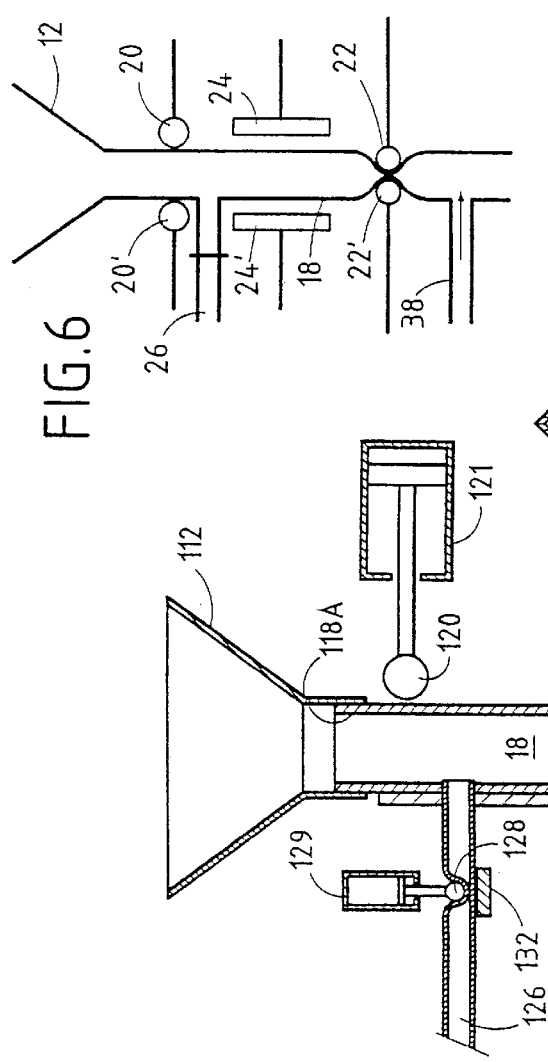
FIG. 6 is a diagrammatic section view that shows an alternate embodiment of the invention.

In the variant shown in FIG. 6, provision has been made for at least one of the pinch or drive members to have two pinch elements 20, 20', and/or 22, 22', and/or 24, 24' situated symmetrically on either side of the duct and capable of being moved apart form each other to occupy a relaxed position, or in the case of the drive member an inactive position, and of being moved towards each other respectively to occupy a pinching position or an active position.

The apparatus of the invention has means for timing the injection of compressed air, the movements of the pinch members 20 and 22, and the movement of the drive member 24.

Various types of means can be implemented for this purpose. Advantageously, hydraulic actuators are used that are powered in turn with fluid under pressure by a rotary distributor. Thus, the pinch members 20 and 22, and also the drive member 24, are secured to respective actuator pistons given references 21, 23, and 25. These actuators are connected to respective pressurized fluid feed pipes 21A, 23A, and 25A, and to respective exhaust pipes 21B, 23B, and 25B. Similarly, the pinch member 28 can be secured to the piston of an actuator 29 connected to a feed pipe 29A and to an exhaust pipe 29B.

The various fluid feed and exhaust pipes are connected to a distributor 36, e.g. a rotary distributor actuated by a motor 37, and situated on a fluid circuit 35 that includes a source of fluid under pressure. The distributor 36 is organized so as to cause the feed pipes to communicate in turn with the source of fluid and to cause the exhaust pipes to communicate in turn with the fluid exhaust for the purpose of controlling the pinch members and the drive member in a timed cycle.

That solution has the advantage of being low in cost and easy to maintain. Alternatively, it is possible to use purely mechanical timing means comprising a system of cams of appropriate shapes co-operating with the outlet shaft of a motor, with the convex portions of the cams urging the pinch members and the drive member into their respective pinching positions, while the concave portions thereof allow said members to return to their respective inactive positions. To organize the timing, appropriate-length concave and convex portions of the cams are angularly offset relative to one another.

It is also possible to provide for the pinch and drive members to be controlled by motors, themselves controlled by an electronic control system so as to comply with desired timing.

The frequency of the timing cycles can be adjusted by means for varying the speed of the rotary distributor or the speed of the motor(s) used for timing purposes.

The embodiment of FIG. 1 enables the duct 18 to comprise a single, relatively short, rectilinear segment situated directly beneath the hopper, thereby reducing the price of the duct and making it easier to handle and install whenever it needs to be replaced.

Figure 5:
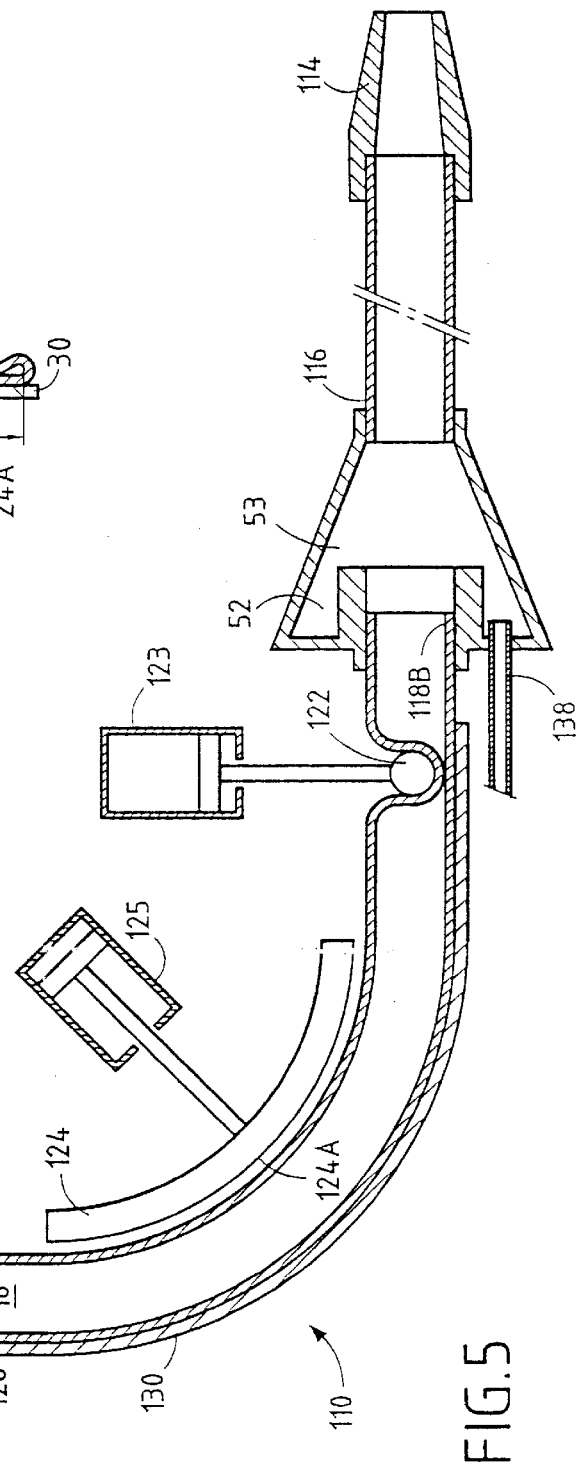
FIG. 5 is a view analogous to FIG. 1 showing a variant embodiment.

In FIG. 1, the duct 18 extends vertically directly beneath the opening 12A of the hopper 12. In this way, the material contained in the hopper has a natural tendency to fall into the duct under the effect of gravity. Nevertheless, in order to facilitate loading the hopper, it can be desirable for the hopper to have a height above the ground that is not too great. Thus, in particular when transporting materials that are semisolid or liquid, in the dilute-flow wet technique, it is possible to decide to place the segment of duct with which the pinch and drive members co-operate in a horizontal position. It is also possible for it to be curved, as shown in FIG. 5.

The apparatus shown in FIG. 1 has additional air injector means comprising an air hose 38 fed continuously with air under pressure and connected to the transport pipe 16 downstream from the second pinch member 22. The hose 38 can be connected to the same source of air under pressure as the hose 26. It serves to accelerate evacuation of the substance and to cause it to be transported continuously in the pipe 16.

The injection of air via the hose 38 can be continuous without running the risk of causing dust to be expelled from the hopper 12, since the portion of duct 18 that is situated upstream from the hose 38 is closed either by the member 20 or by the member 22.

The various operating stages of the apparatus are described below with reference to FIGS. 2A to 2F. These figures are highly diagrammatic, and for simplification purposes, each of them shows only the hopper 12, the duct 18, the first and second pinch members 20 and 22, the drive member 24, the air injection hose 26, and the additional air injection means 38.

Figure 2A:
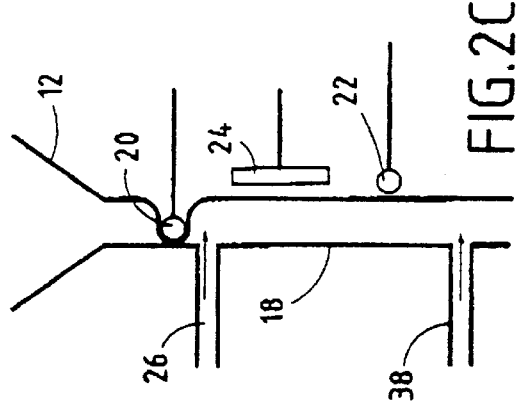
FIGS. 2A to 2F show the operating cycle of the apparatus of the invention.

FIG. 2A shows the same situation as FIG. 1, which corresponds to a filling stage in which the first pinch member 28 is in its relaxed position allowing material to pass into the duct 18, while the air injection means 26 are closed, the drive member 28 is in its inactive position, and the second pinch member 22 is in its pinching position. Under these circumstances, the entire portion of the duct 18 situated upstream from the second pinch member 22 is open, thereby enabling said duct portion to be fed with material contained in the hopper 12.

After this filling stage, the timing cycle has a drive stage in which the first pinch member 20 is necessarily in its pinching position to prevent any material descending into the duct 18 and to prevent any air being driven back into the hopper 12, and in which the second pinch member 22 is in its relaxed position so as to enable the material initially contained in the portion of duct 18 situated upstream from said second pinch member 22 to move downwards downstream from the second pinch member. During this drive stage, the air injection means 26 go from being closed to being opened, and the drive member 24 moves from its inactive position to its active position.

Figure 2D:
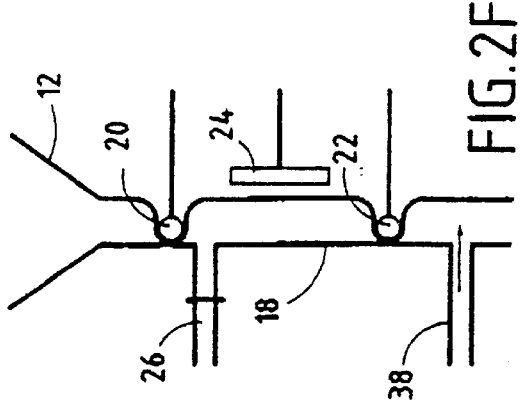
Figure 2B:
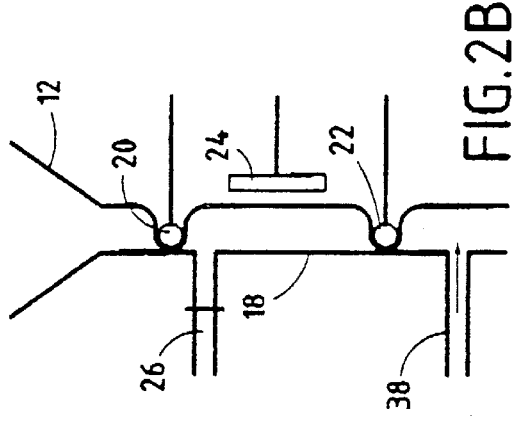

For safety reasons, as shown in FIG. 2B, the member 20 is put into its pinching position before the member 22 is put into its relaxed position. Thereafter the drive stage proper begins which can be subdivided into two periods shown respectively in FIGS. 2C and 2D. Thus, in FIG. 2C, the first and second pinch members 20 and 22 are respectively in the pinching position and in the relaxed position, and the air injection means 26 are open, while the drive member 24 continues temporarily to occupy its inactive position. Air injected via the hose 26 then initiates drive of the substance, with drive being finished off by the drive member 24 passing into its active position as shown in FIG. 2D.

Naturally, this subdivision of the drive stage is only an example. Thus, it is possible to cause the pinch member 20 to take up its pinching position while the pinch member 22 simultaneously takes up its relaxed position, and while causing the air injection means to switch into the open position and the drive member to move into its active position. It is also possible to choose to cause the drive member 24 to move into its active position prior to causing the air injection means 26 to open. In any event, the effects of injecting air from the hose 26 and of the drive provided by the member 24 combine to accelerate and regulate the drive and transport of the material in the downstream direction. During the drive stage, there exists at least one moment in which the air injection means are caused to take up their open position and at least one moment in which the drive member is caused to move from its inactive position into its active position.

After the drive stage, the timing cycle has a decompression stage in which the first and second pinch members 20 and 22 are both in their pinching positions, the air injection means 26 are closed, and the drive member 24 is caused to go from its active position towards its inactive position.

Figure 2E:
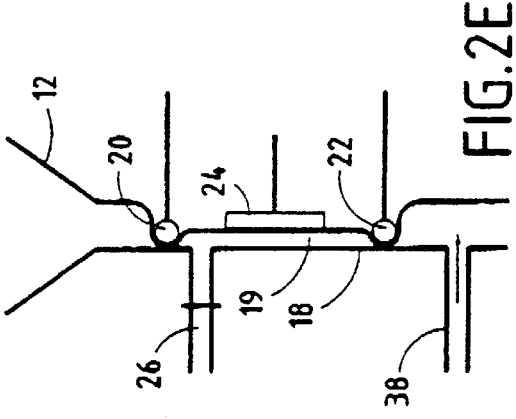
Figure 2C:
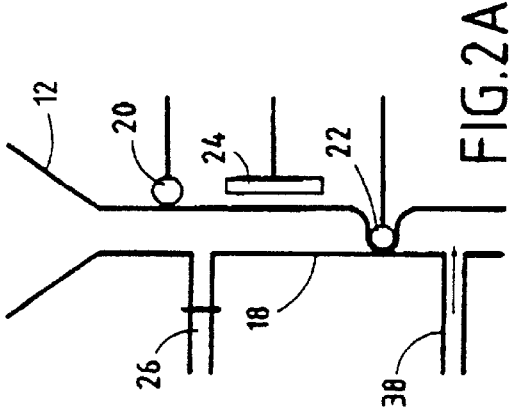

At the end of the drive stage, and before the first pinch member goes from its pinching position to its relaxed position to return to the situation of FIG. 2A, there occurs the situation which is shown in FIG. 2E, in which both pinch members 20 and 22 are in their pinching positions, the drive member 24 is in its active position, and the air injection means 26 are closed. The drive stage is thus terminated by closing the air injection means and by actuating the second pinch member to move from its relaxed position into its pinching position.

Figure 2F:
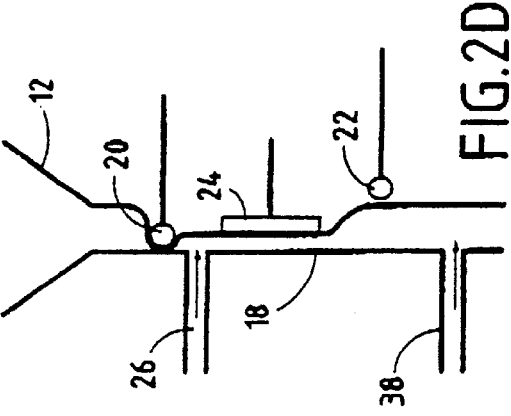

It can happen that the compressed air injected at the end of the drive stage, at much the same time as the second pinch member is caused to take up its pinching position finds itself stored in the chamber 19 that is formed between the first and second pinch members 20 and 22. Nevertheless, because the drive member 24 is then in its active position, the volume of this chamber is extremely small. During the decompression stage, the volume of this chamber is increased by causing the drive member to go from its active position to its inactive position as shown in FIG. 2F. This causes the air contained in said chamber to expand so that it takes up a pressure that is lower than atmospheric pressure. Consequently, when at the end of the decompression stage, the first pinch member 20 is caused to move into its relaxed position to return to the situation shown in FIG. 2A and to restart the cycle, there is no risk of air being driven back under pressure through the hopper 12, and indeed the small amount of suction in the chamber 19 tends to suck material from the hopper 12 more quickly into the duct 18.

To ensure that the volume of the chamber 19 is extremely small when the drive member is in its active position, the drive member can have an active face 24A which extends over the majority of the length of the segment of duct 18 situated between the two pinch members 20 and 22.

Conventionally, the pressure of the air injected by the hose 26 or by the hose 38 can lie in the range 1 bar to 12 bars.

The apparatus advantageously includes means for adjusting the relaxed position of the first pinch member 20, said means serving to limit the extent to which the member 20 can be retracted relative to the duct 18 when it is in the relaxed position to ensure that said member 20 does not release the duct completely when in its relaxed position, contrary to that which is shown in the above drawings, and continues, optionally, to co-operate with the duct to cause it to take up a relaxed section that is smaller than the section it would have if it were free.

Figure 3:
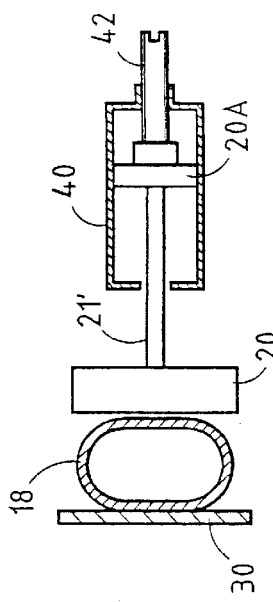
FIGS. 3 and 4 are two diagrammatic cross-section views corresponding respectively to lines III—III and IV—IV of FIG. 1 and respectively showing a variant embodiment of the first pinch member and a variant concerning the drive member.

Thus, by acting on such adjustment means, it is possible to put a limit on the maximum throughput of the apparatus. FIG. 3 shows an embodiment of such adjustment means. The pinch member 20 has an end portion 20A remote from the active portion of said member which co-operates with the duct 13, and connected thereto, for example, by a link rod 21'. During displacement of the pinch member 20 in a direction that extends transversely to the duct 18, said end portion 20A slides relative to a support 40 which is provided with an adjustable abutment 42, e.g. constituted by a screw held in an opening in the support 40.

In the relaxed position of the member 20, the end portion 20A co-operates by coming into abutment with the abutment 42 so the position thereof determines the furthest removed position of the member 20 relative to the duct 18. Thus, as shown in FIG. 3, it is possible to place the abutment member 42 in a situation in which the pinch member 20 when in its relaxed position causes the section of the duct 18 to be slightly diminished compared with the section it would have in the free state. The support 40 can be the cylinder of the actuator 21 mentioned above.

Figure 4:
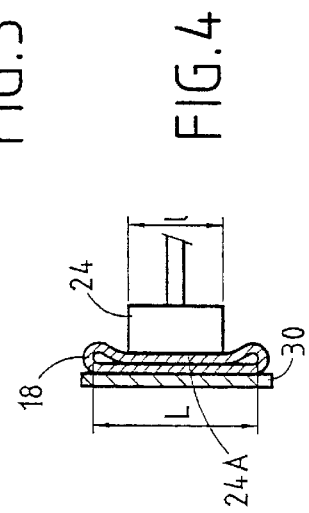

FIG. 4 is a diagram showing the configuration of the duct 18 in the region of the drive member 24 when the drive member is in its active position. This figure shows an advantageous variant in which the active face 24A of the drive member 24, i.e. the portion of said member which co-operates directly with the duct 18, is of a width l that is less than the width L presented by the internal periphery of the duct when it is in its compressed state. These two widths are both measured across the duct, and more precisely they are measured perpendicularly to the longitudinal axis of the duct in the pinch plane thereof. It can thus be seen that even when the active position of the drive member 24 corresponds to a situation in which the duct is practically pinched by said drive member, the pinching does not extend to the "sides" of the duct. This disposition makes it possible to limit deterioration of the duct in the region of the drive member since, conventionally, it is the sides of the duct which suffer most during pinching, with said sides taking up folds that are substantially permanent and that prevent the duct returning elastically to its initial dimensions, and which can even end up by splitting.

In FIG. 5, elements analogous to those of FIG. 1 are given the same references plus 100. The duct 118 follows a circular arc between its connection to the hopper 112 and its connection to the transport pipe 116. The drive member 124 and the rigid wall element 130 are of corresponding circularly arcuate shape, with the member 124 moving radially relative to the circular arc described by its active face 124A.

This advantageous disposition makes it easier to transport substances which run the risk of forming plugs in a bend analogous to the bend 16A shown in FIG. 1, given that the radius of curvature of the duct 118 is much greater than that of the bend.

It also avoids the wear or clogging that could occur in the bend 16A when transporting sticky materials, and it reduces the total height of the apparatus.

FIG. 5 also shows another advantageous disposition which consists in providing a decompression and mixing chamber 53 downstream from the second pinch member 122. An annular air inlet chamber 52 into which the hose 138 leaves is formed in the upstream portion of the chamber 53.

In this way, the mixture of air/substance that is driven downstream from the member 22 expands in the chamber 53 and mixes with the additional air entering via the hose 138, thereby improving the uniformity of the air/substance mixture and enhancing judder-free spraying of the material from the nozzle 114.

What is claimed is:

1. Apparatus for transporting a particulate or granular material, which apparatus comprises a flexible duct having an upstream end connected to material feed means, and a downstream end, means for pinching said duct in a timed manner, and means for injecting compressed air into the duct and capable of being opened and closed in the timed manner, said means for pinching the duct comprising a first pinch member and a second pinch member situated downstream from the first pinch member in the material transport direction, each pinch member having corresponding counter pinching means for cooperation therewith and being movable transversely to the duct between a relaxed position and a pinching position;

the apparatus further including a drive member situated between said first and second pinch members and being operative to be displaced transversely to the duct between an inactive position and an active position in which it co-operates with the duct substantially to flatten the latter;

the air injection means opening out into a region of the duct situated between the first and second pinch members in the vicinity of said first pinch member;

means for timing the injection of compressed air and the movements of the pinch members and of the drive member to perform successive cycles comprising the following stages;

a filling stage in which the first pinch member is in the relaxed position thereof, the air injection means are closed, the drive member is in the inactive position thereof, and the second pinch member is in pinching position thereof;

a drive stage during which the first pinch member is in the pinching position thereof, the air injection means move from being closed to being opened, the drive member moves from the inactive position to the active position, and the second pinch member is in the relaxed position thereof, and a decompression stage, which occurs after the drive stage and in which the first and second pinch members are in the respective pinching positions thereof, the air injection means are closed and the drive member is caused to move from the active position towards the inactive position thereof.

2. Apparatus according to claim 1, including means for adjusting the frequency of the timing cycles.

3. Apparatus according to claim 1, wherein the pinch members and the drive member are placed on a rectilinear segment of the duct.

4. Apparatus according to claim 1, wherein the pinch members and the drive member are disposed on a circularly arcuate segment of the duct.

5. Apparatus according to claim 1, further including additional air injection means connected downstream from the second pinch member.

6. Apparatus according to claim 5, wherein the additional air injection means open out into a decompression and mixing chamber.

7. Apparatus according to claim 1, including means for adjusting the relaxed position of the first pinch member.

8. Apparatus according to claim 1, wherein the drive member has an active face suitable for co-operating with the duct, the width of said active face as measured across the duct being smaller than the width presented by the inside periphery of the duct when the latter is in its compressed state.

9. Apparatus according to claim 1, wherein said counter pinching means includes a stationary member formed by a rigid wall element disposed against one side of the duct, the pinch members and the drive member being situated on the other side of the duct, remote from the wall element.

10. Apparatus according to claim 1, wherein the counter pinching means comprises a first counter pinch member situated on an opposite side of the duct with respect to the first pinch member and a second counter pinch member situated on an opposite side of the duct with respect to the second pinch member.

11. Apparatus according to claim 1, wherein the pinch members and the drive member are secured to the moving portions of actuators connected to a fluid distributor.

12. Apparatus according to claim 10, comprising a third counter pinch member situated on an opposite side of the duct with respect to the drive member.

* * * * *